United States Patent
Kubik et al.

(10) Patent No.: US 9,308,985 B2
(45) Date of Patent: Apr. 12, 2016

(54) DECELERATION TO HOVER MODULATION

(71) Applicant: Sikorsky Aircraft Corporation, Stratford, CT (US)

(72) Inventors: Stephen Kubik, Shelton, CT (US); Alex Faynberg, Cheshire, CT (US); Stephen C. Mcculley, Palm City, FL (US); John P. Rucci, Jupiter, FL (US); Christiaan P. Corry, Jupiter, FL (US); Edward Pavelka, San Diego, CA (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 65 days.

(21) Appl. No.: 14/251,133

(22) Filed: Apr. 11, 2014

(65) Prior Publication Data

US 2015/0291277 A1    Oct. 15, 2015

(51) Int. Cl.
| | |
|---|---|
| B64C 13/00 | (2006.01) |
| B64C 13/50 | (2006.01) |
| G05D 13/62 | (2006.01) |
| G05D 1/02 | (2006.01) |
| G05D 13/02 | (2006.01) |
| G05D 1/10 | (2006.01) |

(52) U.S. Cl.
CPC ............ *B64C 13/503* (2013.01); *G05D 1/0202* (2013.01); *G05D 1/102* (2013.01); *G05D 13/02* (2013.01); *G05D 13/62* (2013.01)

(58) Field of Classification Search
CPC ........ B64C 13/00; G05D 13/00; G05D 13/62; G05D 1/04; G05D 1/02

USPC ............. 701/3, 5, 14, 18; 340/973, 974, 977, 340/979

See application file for complete search history.

(56) References Cited

U.S. PATENT DOCUMENTS

| | | | |
|---|---|---|---|
| 4,801,110 A | 1/1989 | Skutecki | |
| 5,001,646 A * | 3/1991 | Caldwell et al. | 701/7 |
| 7,512,464 B2 | 3/2009 | Tarleton et al. | |
| 7,742,846 B2 | 6/2010 | Fanciullo et al. | |
| 2004/0093130 A1* | 5/2004 | Osder et al. | 701/3 |
| 2010/0324758 A1* | 12/2010 | Piasecki et al. | 701/3 |

FOREIGN PATENT DOCUMENTS

EP    0127250 A2    12/1984

OTHER PUBLICATIONS

European Search Report; EP application 15153985.5; Dated Dec. 9, 2015; 13 pages.
Sridhar et al., "Rotorcraft Deceleration to Hover Using Image-based Guidance"; 1989 American Control Conference, Pittsburgh, PA; Jun. 21-23 1989; 12 pages.

* cited by examiner

*Primary Examiner* — Tan Q Nguyen
(74) *Attorney, Agent, or Firm* — Cantor Colburn LLP

(57) ABSTRACT

A system and method for controlling a deceleration profile of an aircraft, includes a processor and memory that receives a signal indicative of a deceleration command; receives signals indicative of a sensed velocity and a commanded heading rate; determines a commanded velocity in response to the receiving of the deceleration command and the commanded heading rate; determines an estimated deceleration command as a function of the commanded velocity; and determines an actual deceleration command in response to the determining of the estimated deceleration command.

20 Claims, 4 Drawing Sheets

DECELERATION TO HOVER MODULATION

STATEMENT REGARDING FEDERALLY SPONSORED RESEARCH OR DEVELOPMENT

This invention was made with Government support with the United States Navy under Contract No. N00019-06-C-0081. The Government therefore has certain rights in this invention.

FIELD OF THE INVENTION

The subject matter disclosed herein relates generally to the field of control systems in rotorcraft and, in particular, to an advanced control law that utilizes a fly-by-wire system to augment a preprogrammed deceleration profile for a rotorcraft.

DESCRIPTION OF RELATED ART

Many vehicles, including helicopters, use an onboard fly-by-wire (FBW) system to control vehicle operation. Emerging FBW helicopters provide high levels of augmentation. These FBW systems greatly reduce pilot workload and enhance safety. Part of the safety enhancements includes control inputs that allow pilots to aggressively maneuver within the airframe structural limits and not exceed these limits. Within these flight control systems, it is possible for the pilot to engage a deceleration mode whereby the flight control system follows an automated deceleration profile in order to automatically decelerate to a specific location. However, in typical aircraft, a pilot may not be able to augment the automated deceleration profile once initiated. This often results in the helicopter overshooting the specific location by flying a very controlled approach to a wrong location. Improvements in providing an advanced control law that allows a pilot to augment the deceleration profile once engaged would be well received in the art.

BRIEF SUMMARY

According to an embodiment of the invention, a method for controlling a deceleration profile of an aircraft, includes receiving, with a processor, a signal indicative of a deceleration command; receiving with the processor, signals indicative of a sensed velocity and a commanded heading rate; determining, with the processor, a commanded velocity in response to the receiving of the deceleration command and the commanded heading rate; determining, with the processor, an estimated deceleration command as a function of the commanded velocity; and determining, with the processor, an actual deceleration command in response to the determining of the estimated deceleration command.

In addition to one or more of the features described above, or as an alternative, further embodiments could include receiving of the deceleration command further comprises receiving longitudinal and lateral deceleration commands.

In addition to one or more of the features described above, or as an alternative, further embodiments could include determining a commanded longitudinal velocity and a commanded lateral velocity.

In addition to one or more of the features described above, or as an alternative, further embodiments could include determining a longitudinal velocity error signal indicative of a difference between the commanded longitudinal velocity and a sensed longitudinal velocity.

In addition to one or more of the features described above, or as an alternative, further embodiments could include determining a lateral velocity error signal indicative of a difference between the commanded lateral velocity and a sensed lateral velocity.

In addition to one or more of the features described above, or as an alternative, further embodiments could include determining a commanded acceleration in response to the receiving of the deceleration command.

In addition to one or more of the features described above, or as an alternative, further embodiments could include determining a second error value indicative of a difference between the commanded acceleration and a sensed acceleration.

In addition to one or more of the features described above, or as an alternative, further embodiments could include determining a longitudinal commanded gain ratio as a function of the longitudinal velocity error signal and a total velocity magnitude.

In addition to one or more of the features described above, or as an alternative, further embodiments could include determining a lateral commanded gain ratio as a function of the lateral velocity error signal and a total velocity magnitude.

In addition to one or more of the features described above, or as an alternative, further embodiments could include determining the estimated deceleration command as a function of the total velocity magnitude.

In addition to one or more of the features described above, or as an alternative, further embodiments could include determining a Translational Rate Command response wherein controller deflection correlates to steady state velocity.

According to another embodiment of the invention, a system for controlling a deceleration profile of an aircraft includes a propeller comprising a plurality of blades, wherein the propeller is associated with a sensor; a processor; and memory having instructions stored thereon that, when executed by the processor, cause the system to: receive a signal indicative of a deceleration command; receive signals indicative of a sensed velocity and a commanded heading rate; determine a commanded velocity in response to the receiving of the deceleration command and the commanded heading rate; determine an estimated deceleration command as a function of the commanded velocity; and determine an actual deceleration command in response to the determining of the estimated deceleration command.

In addition to one or more of the features described above, or as an alternative, further embodiments could include a processor that is configured to receive longitudinal and lateral deceleration commands.

In addition to one or more of the features described above, or as an alternative, further embodiments could include a processor that is configured to determine a commanded longitudinal velocity and a commanded lateral velocity.

In addition to one or more of the features described above, or as an alternative, further embodiments could include a processor that is configured to determine a longitudinal velocity error signal indicative of a difference between the commanded longitudinal velocity and a sensed longitudinal velocity.

In addition to one or more of the features described above, or as an alternative, further embodiments could include a processor that is configured to determine a lateral velocity error signal indicative of a difference between the commanded lateral velocity and a sensed lateral velocity.

In addition to one or more of the features described above, or as an alternative, further embodiments could include a processor that is configured to determine a commanded acceleration in response to the receiving of the deceleration command.

In addition to one or more of the features described above, or as an alternative, further embodiments could include a processor that is configured to determine a second error value indicative of a difference between the commanded acceleration and a sensed acceleration.

In addition to one or more of the features described above, or as an alternative, further embodiments could include a processor that is configured to determine a longitudinal commanded gain ratio as a function of the longitudinal velocity error signal and a total velocity magnitude.

In addition to one or more of the features described above, or as an alternative, further embodiments could include a processor that is configured to determine a lateral commanded gain ratio as a function of the lateral velocity error signal and a total velocity magnitude.

Other aspects, features and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which like elements are numbered alike in the several FIGURES:

DETAILED DESCRIPTION

Figure 1:
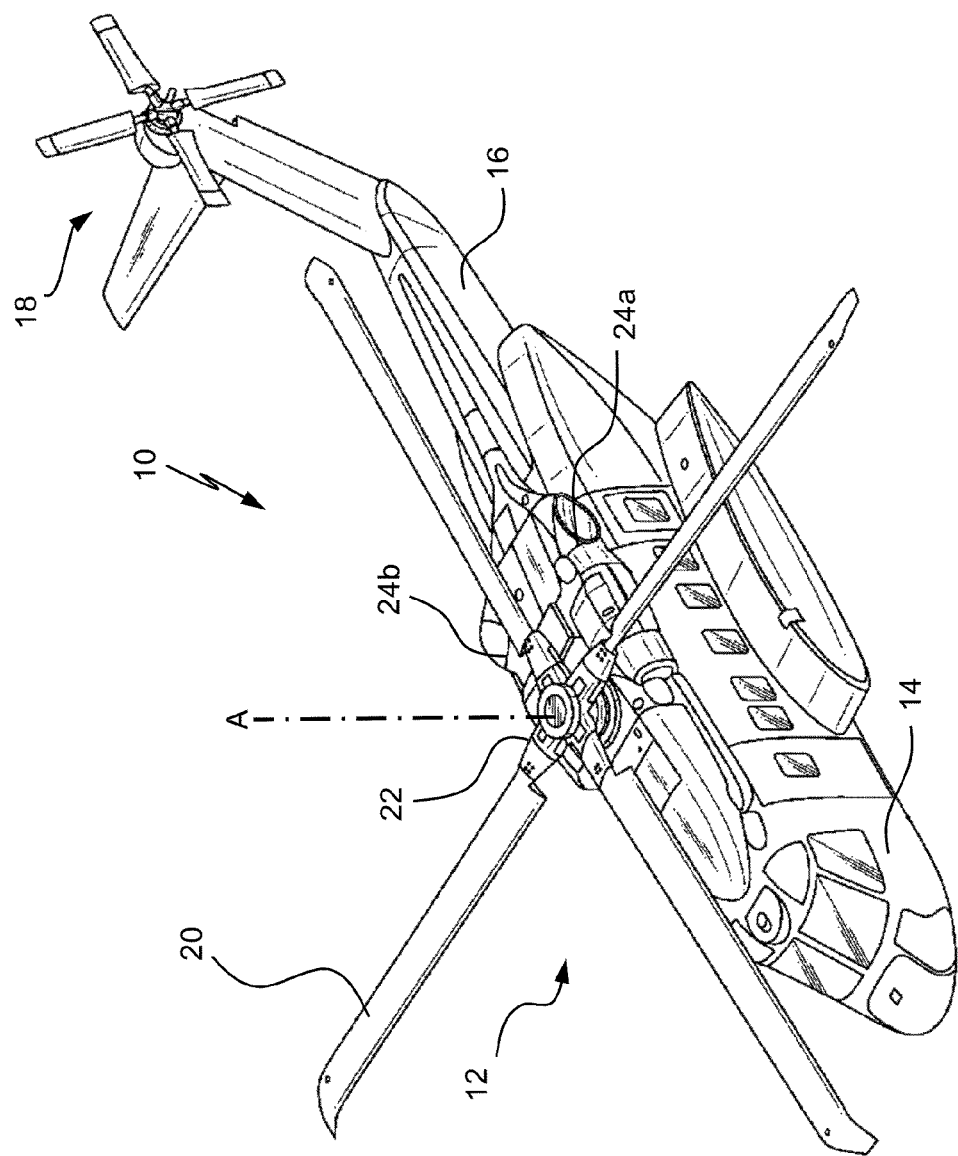
FIG. 1 is a perspective view of an example rotary wing aircraft for use with embodiments of the invention.

Referring to the drawings, FIG. 1 schematically illustrates a rotary wing aircraft 10 which includes an augmented flight control system according to an embodiment. The aircraft 10 includes an airframe 14 having a main rotor assembly 12 and an extending tail 16 which mounts a tail rotor system 18, such as an anti-torque system, a translational thrust system, a pusher propeller, a rotor propulsion system and the like. The main rotor assembly 12 includes a plurality of rotor blades 20 mounted to a rotor hub 22. The main rotor assembly 12 is driven about an axis of rotation A through a main rotor gearbox (not shown) by a powerplant system, here shown as two internal combustion engines 24a-24b. Although a particular helicopter configuration is illustrated and described in the disclosed embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from embodiments of the invention.

Figure 2:
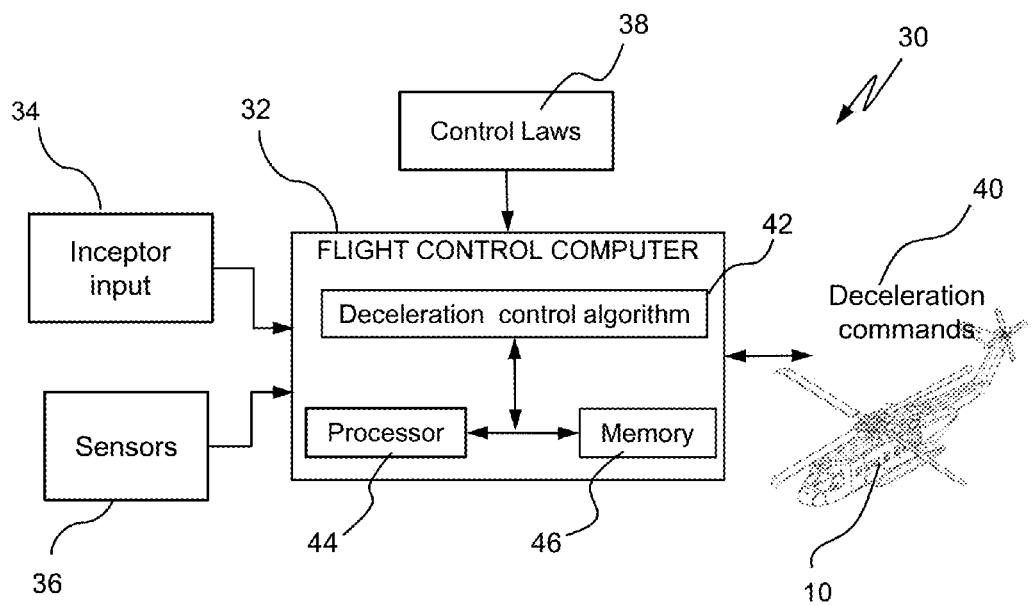
FIG. 2 is a schematic block diagram of an embodiment of a control system for a rotary wing aircraft.

FIG. 2 illustrates an example of a flight control system 30 that utilizes a model following control system that receives, in an embodiment, a real-time deceleration-to-hover command via cyclic and/or collective sticks in order to adjust or augment a pre-programmed or stored deceleration profile. The pre-programmed deceleration profile facilitates deceleration of the aircraft 10 to a hover. The control system 30 may be, in embodiments, a full authority or a limited authority flight control system which provides feed-forward and feedback paths to achieve the desired response characteristics. The control system 30 implements a deceleration-to-hover control algorithm 42 that augments the pre-programmed deceleration profile and provides attitude commands for controlling the cyclic and/or collective pitch when the stick is moved out of detent. Moving the stick out of detent controls the swashplate angle and holds the swashplate in that position until the stick is released upon which the automated deceleration profile is re-initiated. The control system 30 provides an architecture that can be used to provide a useable Translational Rate Command (TRC) like response where controller deflection correlates to steady state velocity. In this instance, the deceleration-to-hover command is scheduled to grow as a function of total groundspeed speed. When the pilot makes a steady state input, the aircraft gains speed, the deceleration command grows until it equalizes with the Decel-to-Hover command and the aircraft holds velocity. While deceleration commands are being referenced throughout this disclosure, it is to be appreciated that reference to acceleration commands can include positive acceleration as well as negative acceleration (or deceleration).

A schematic of a control system 30 to accomplish this is illustrated. Pilot commands/inputs 34 from pilot inceptors such as, for example, a cyclic stick and/or foot pedals are received by a flight control computer 32 as a commanded acceleration or deceleration for trim attitude changes. A number of sensors 36 are provided in order to sense flight conditions of aircraft 10 such as, in some non-limiting examples, longitudinal velocity, lateral velocity, airspeed, measured thrust, measured torque or the like. Data from sensors 36 is directed to flight control computer 32 operably connected to sensors 36 where they are compared to control laws 38 and a look-up table with notional estimated values of a relationship between attitude and acceleration. Flight control computer 32 communicates command signals as acceleration and deceleration command signals 40, e.g., lateral and longitudinal deceleration commands for aircraft 10. In embodiments, flight control commands 40 may be estimated from aircraft parameters or determined according to a schedule of attitude to acceleration as a function of sensed longitudinal velocity of aircraft 10, sensed lateral velocity of aircraft 10 or the like.

In an embodiment, flight control computer 32 includes a memory 46. Memory 46 stores the deceleration-to-hover control algorithm 42 as executable instructions that is executed by a processor 44. The instructions may be stored or organized in any manner and at any level of abstraction, such as in connection with the execution of the deceleration-to-hover control algorithm 42. Processor 44 may be any type of processor (CPU), including a general purpose processor, a digital signal processor, a microcontroller, an application specific integrated circuit, a field programmable gate array or the like. Also, in embodiments, memory 46 may include random access memory (RAM), read only memory (ROM), or other electronic, optical, magnetic or any other computer readable medium onto which is stored deceleration-to-hover control algorithm 42 described below.

Figure 3:
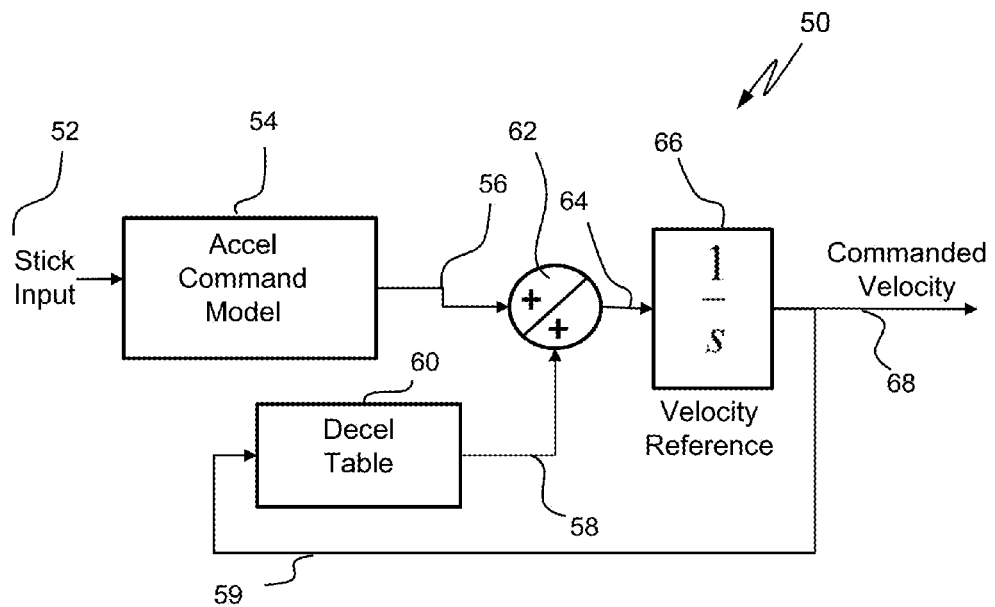
FIG. 3 is a schematic block diagram of a deceleration to hover strategy according to an embodiment of the invention.

FIG. 3 illustrates a schematic view of a high-level deceleration to hover strategy 50 as part of control algorithm 42 of Flight Control Computer 32. Initially, signals 52 from a pilot inceptor such as, for example, a cyclic stick and/or a collective stick are received by an acceleration command model 54.

A pilot for aircraft 10 can perturb the system by commanding delta acceleration from a trim schedule. This allows the pilot to increase or decrease a scheduled deceleration through pilot sticks, giving them the ability to manipulate the final destination. As a non-limiting example, signals 52 are received by control system 30 that represent pilot stick inputs to aircraft 10. Pilot stick inputs are interpreted by acceleration command model 54 as trim attitude changes and are converted into additive acceleration or deceleration command signals 56 which are subsequently integrated into reference velocities in integrator block 66. Signal 56 represents a pilot commanded delta acceleration commands. Signal 59 represents reference velocities from the acceleration integrators 66 that are received by a deceleration look-up table 60. Deceleration look-up table 60 outputs one or more signals 58 representing scheduled acceleration commands that are provided to a summation block 62. A signal 64 for a total value between signal 56 and signal 58 is determined in Summation block 62. Signal 64 is fed to an integrator block 66 that integrates the input over time for determination of reference velocity commands 68. Reference velocity commands 68 represents commanded velocity commands that are also provided as feedback signals for command of rotor 12 (FIG. 1) for, in an embodiment, modulating the automated deceleration profile and hand-flying the aircraft 10 to a hover at a desired final location. The benefits of strategy 50 is that the architecture is attitude independent with the output of the acceleration command model 54 and the deceleration to hover table 60 summing to total acceleration. The structure provides commanded accelerations and commanded velocities such that the quantities can be controlled via feedback loop closures to determine the appropriate pitch and roll trim attitudes.

Figure 4:
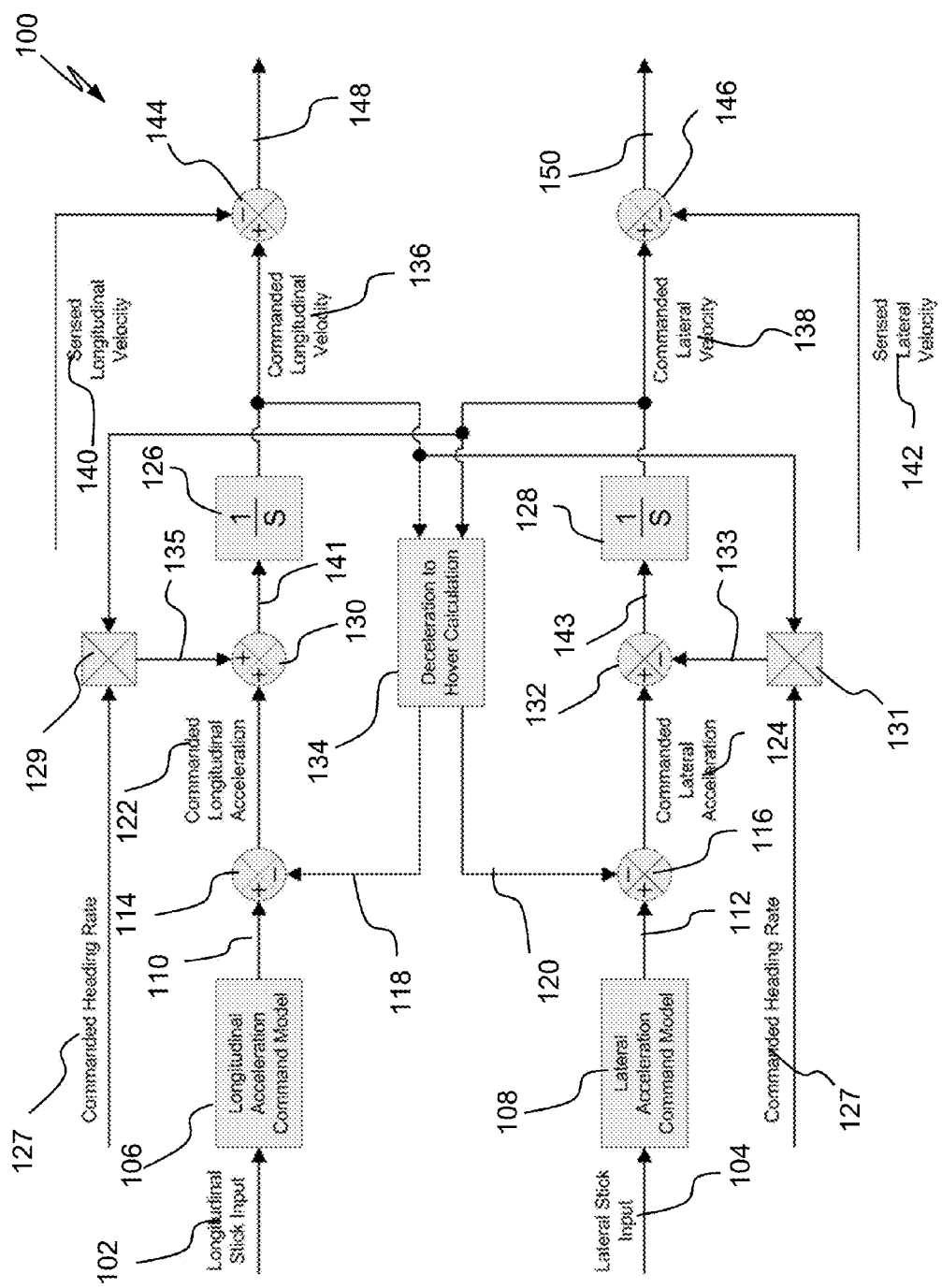
FIG. 4 is a schematic view of a loop closure control strategy according to an embodiment of the invention.

FIG. 4 illustrates a schematic view of a detail of a loop closure strategy 100 that is implemented by control algorithm 42 for augmenting pilot commands that are received according to an embodiment of the invention. In an embodiment, implementation of control algorithm 42 begins when flight control computer 32 (FIG. 2) receives and stores pilot stick inputs such as, for example, longitudinal stick inputs 102 and lateral stick inputs 104. Longitudinal stick inputs 102 and lateral stick inputs 104 represent commanded cyclic and/or collective attitude commands that are received from pilot inceptors. The longitudinal stick input 102 is interpreted by a longitudinal acceleration command model 106 and is converted into a signal 110 as additive commanded longitudinal acceleration. Similarly, lateral stick input 104 is interpreted by a lateral acceleration command model 108 and is converted into a signal 112 for an additive commanded lateral acceleration. Calculation block 134 provides signals representing estimated commanded longitudinal acceleration 118 and estimated commanded lateral acceleration 120 to respective summation blocks 114, 116 for determination of an error value through an additive determination. Error value 122 is a delta commanded longitudinal acceleration while error value 124 is a delta commanded lateral acceleration. Also, in order to close linear acceleration feedbacks, signals that represent a commanded longitudinal groundspeed 136 is fedback to a multiplier block 131 where it is multiplied with a signal that represents commanded heading rate 127, which represents pedal inputs that command heading rate and provides an ability for the pilot to be able to change the ground track angle. The output of multiplier block 131 is sensed longitudinal acceleration 133. Also, Sensor signal 138 representing commanded lateral groundspeed is fedback to a multiplier block 129 where it is multiplied with a signal that represents commanded heading rate 127 in order to output sensed lateral acceleration 135. Additionally, commanded longitudinal and lateral velocities/groundspeeds 136, 138 are fedback to deceleration to hover calculation block 134 for determination of estimated commanded longitudinal acceleration 118 and estimated commanded lateral acceleration 120, for processing as described above with respect to FIG. 4.

Sensed lateral acceleration 135 and delta commanded longitudinal acceleration 122 are provided to summation block 130 which outputs error signal 141. Similarly, sensed longitudinal acceleration 133 and delta commanded lateral acceleration 124 are provided to summation block 132 which outputs error signal 143. Error signals 141, 143 are applied to respective integrators 126, 128 to output a value of an integral of its input signal with respect to time. Integrators 126, 128 output respective output signals that represent commanded longitudinal velocity/groundspeed 136 and commanded lateral velocity/groundspeed 138 for aircraft 10. Also, in order to close linear velocity feedbacks, signals for sensed linear velocities such as, for example, sensed longitudinal velocity/groundspeed 140 and sensed lateral velocity/groundspeed 142 are received from one or more sensors 36 (FIG. 2) and fed to respective summation blocks 144, 146 for comparison with commanded longitudinal velocity 148 and commanded lateral velocity 150. Output signals 148, 150 represent error values of signals for commanded longitudinal and lateral velocities respectively.

Figure 5:
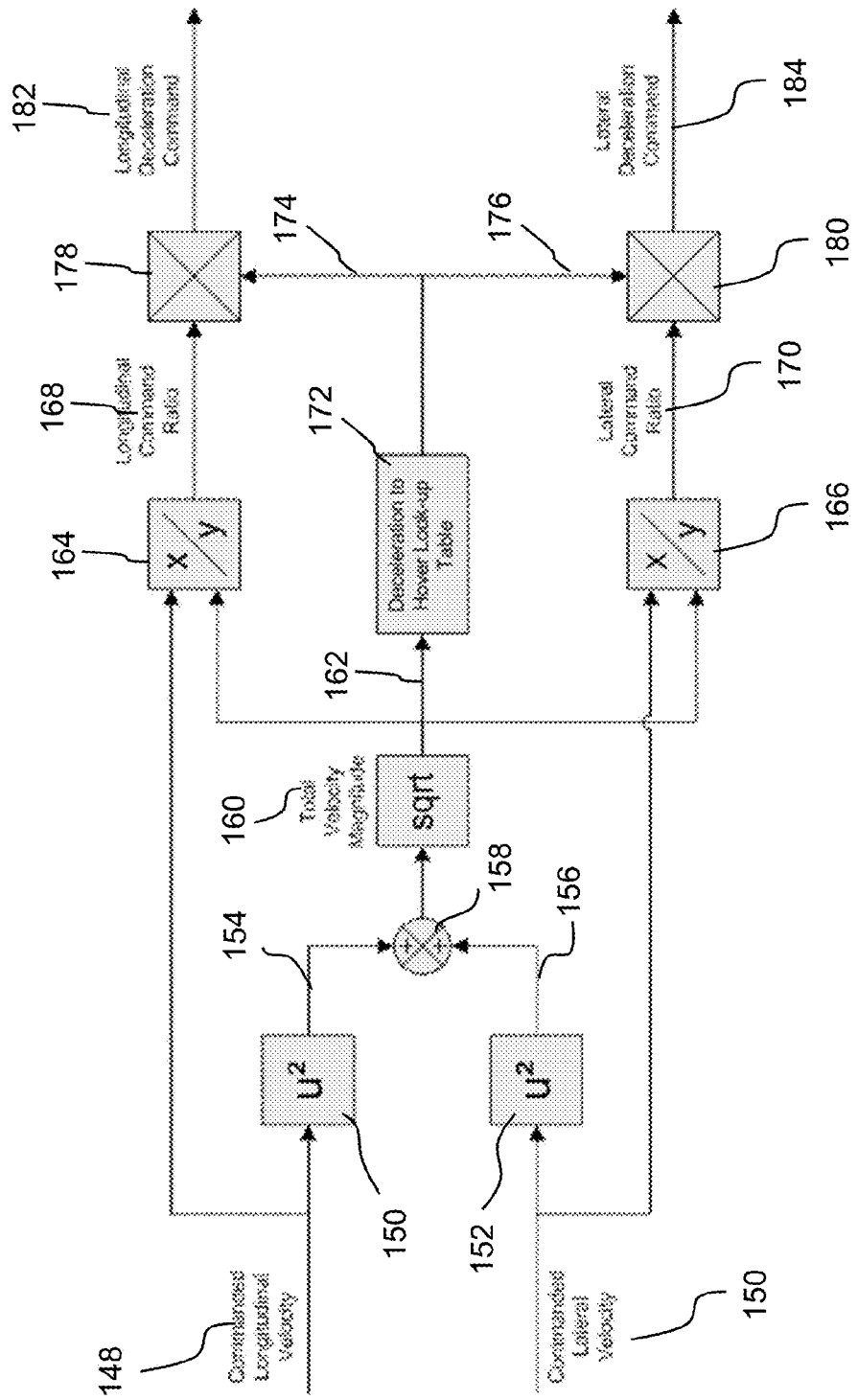
FIG. 5 is a schematic view of a control law according to an embodiment of the invention.

Referring to FIG. 5, the commanded longitudinal velocity 148 is applied to a square product block 150 while the commanded lateral velocity signal 150 is applied to square product block 152. The output signals 154, 156 representing magnitudes of commanded velocities are added in a summation block 158 and fed to a square root block 160 for determination of a magnitude of the total commanded velocity 162. The magnitude of the total commanded velocity 162 (as a "Y" input) and commanded longitudinal velocity signal 148 (as a "X" input) is applied to an advance ratio block 164 for dividing X by Y. Output value 168 represents a longitudinal commanded gain ratio signal 168. The magnitude of the total commanded velocity 162 (as a "Y" input) and commanded lateral velocity signal 150 (as an "X" input) is applied to an advance ratio block 166 for dividing X by Y. Output value 170 represents a lateral commanded gain ratio signal 170.

Further, the magnitude of the total commanded velocity 162 is applied to a deceleration to hover look-up table 172 and signals 174, 176 representing respective estimated longitudinal acceleration commands and lateral acceleration commands are provided to respective product blocks 178, 180. The estimated acceleration commands 174, 176 are multiplied by respective gain ratios in order to determine respective actual commanded longitudinal deceleration command signals 182 and actual commanded lateral deceleration command signals 184 for modulating the scheduled deceleration profile and hand-fly the aircraft 10 to the desired final location.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. For instance, aspects of the invention are not limited to rotorcraft, and can be used in wind turbines, engine turbines, and other systems with rotary elements. Many modifications, variations, alterations, substitutions or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method for controlling a deceleration profile of an aircraft, comprising:
   determining the deceleration profile to obtain a hover condition at a commanded location; and
   adjusting the deceleration profile in a continuous manner by manual input from a pilot, wherein adjusting comprises:
      receiving, with a processor, a signal indicative of a deceleration command;
      receiving with the processor, signals indicative of a sensed velocity and a commanded heading rate;
      determining, with the processor, a commanded velocity in response to the receiving of the deceleration command and the commanded heading rate;
      determining, with the processor, an estimated deceleration command as a function of the commanded velocity; and
      determining, with the processor, an actual deceleration command in response to the determining of the estimated deceleration command.

2. The method of claim 1, wherein the receiving of the deceleration command further comprises receiving longitudinal and lateral deceleration commands.

3. The method of claim 1, wherein the determining of the commanded velocity further comprises determining a commanded longitudinal velocity and a commanded lateral velocity.

4. The method of claim 3, further comprising determining a longitudinal velocity error signal indicative of a difference between the commanded longitudinal velocity and a sensed longitudinal velocity.

5. The method of claim 4, further comprising determining a longitudinal commanded gain ratio as a function of the longitudinal velocity error signal and a total velocity magnitude.

6. The method of claim 5, further comprising determining a lateral commanded gain ratio as a function of the lateral velocity error signal and a total velocity magnitude.

7. The method of claim 6, further comprising determining the estimated deceleration command as a function of the total velocity magnitude.

8. The method of claim 3, further comprising determining a lateral velocity error signal indicative of a difference between the commanded lateral velocity and a sensed lateral velocity.

9. The method of claim 1, further comprising determining a commanded acceleration in response to the receiving of the deceleration command.

10. The method of claim 9, further comprising determining a second error value indicative of a difference between the commanded acceleration and a sensed acceleration.

11. The method of claim 1, further comprising determining a Translational Rate Command response wherein controller deflection correlates to steady state velocity.

12. A system for controlling a deceleration profile of an aircraft, comprising
   a propeller comprising a plurality of blades, wherein the propeller is associated with a sensor;
   a processor; and
   memory having instructions stored thereon that, when executed by the processor, cause the system to:
      determine the deceleration profile to obtain a hover condition at a commanded location, wherein the deceleration profile is adjustable in a continuous manner by manual input from a pilot;
      receive a signal indicative of a deceleration command;
      receive signals indicative of a sensed velocity and a commanded heading rate;
      determine a commanded velocity in response to the receiving of the deceleration command and the commanded heading rate;
      determine an estimated deceleration command as a function of the commanded velocity; and
      determine an actual deceleration command in response to the determining of the estimated deceleration command.

13. The system of claim 12, wherein the processor is configured to receive longitudinal and lateral deceleration commands.

14. The system of claim 12, wherein the processor is configured to determine a commanded longitudinal velocity and a commanded lateral velocity.

15. The system of claim 14, wherein the processor is configured to determine a longitudinal velocity error signal indicative of a difference between the commanded longitudinal velocity and a sensed longitudinal velocity.

16. The system of claim 15, wherein the processor is configured to determine a longitudinal commanded gain ratio as a function of the longitudinal velocity error signal and a total velocity magnitude.

17. The system of claim 14, wherein the processor is configured to determine a lateral velocity error signal indicative of a difference between the commanded lateral velocity and a sensed lateral velocity.

18. The system of claim 17, wherein the processor is configured to determine a lateral commanded gain ratio as a function of the lateral velocity error signal and a total velocity magnitude.

19. The system of claim 12, wherein the processor is configured to determine a commanded acceleration in response to the receiving of the deceleration command.

20. The system of claim 19, wherein the processor is configured to determine a second error value indicative of a difference between the commanded acceleration and a sensed acceleration.

* * * * *